United States Patent [19]
Nakanishi et al.

[11] Patent Number: 5,521,394
[45] Date of Patent: May 28, 1996

[54] COMPACT DISPLACEMENT DETECTING SYSTEM WITH OPTICAL INTEGRATED CIRCUIT AND CONNECTOR IN-LINE WITH OPTICAL AXIS

[75] Inventors: Noriko Nakanishi; Hidehiro Kume, both of Tokyo, Japan

[73] Assignee: Sony Magnescale Inc., Tokyo, Japan

[21] Appl. No.: 319,104

[22] Filed: Oct. 6, 1994

[30] Foreign Application Priority Data

Oct. 8, 1993 [JP] Japan ................................. 5-253175

[51] Int. Cl.⁶ ........................................... G01N 21/86
[52] U.S. Cl. ................... 250/559.22; 250/201.4; 356/376
[58] Field of Search .................... 250/201.3, 201.4, 250/201.5, 559.22; 369/44.14, 44.19, 44.23, 44.11, 44.13; 356/376

[56] References Cited

U.S. PATENT DOCUMENTS

| | | | |
|---|---|---|---|
| 5,144,603 | 9/1992 | Mozume et al. | 369/44.14 |
| 5,247,165 | 9/1993 | Hiruta et al. | 250/201.3 |
| 5,283,771 | 2/1994 | Kadowaki et al. | 369/44.14 |

FOREIGN PATENT DOCUMENTS

4-366711  12/1992  Japan .

*Primary Examiner*—Edward P. Westin
*Assistant Examiner*—Que T. Le
*Attorney, Agent, or Firm*—Foley & Lardner

[57] ABSTRACT

A displacement detecting system comprises an optical detector which includes a one-chip optical IC having a laser light source, light receiving elements for generating, in response to laser light reflected by a surface to be measured, a focus error signal indicative of a deviation of a distance between the surface and an objective lens from a focal length thereof, and a prism.

14 Claims, 8 Drawing Sheets

COMPACT DISPLACEMENT DETECTING SYSTEM WITH OPTICAL INTEGRATED CIRCUIT AND CONNECTOR IN-LINE WITH OPTICAL AXIS

BACKGROUND OF THE INVENTION

The present invention relates generally to a system for detecting a displacement between an objective lens and a surface to be measured and more particularly, to the system using the optical astigmatic method.

The non-contact measuring method such as the optical astigmatic method, critical angle detecting method, or knife edge method is conventionally known, which serves to measure a displacement between the objective lens and the surface to be measured, or a shape and roughness of the surface. A displacement detecting system using such measuring method includes, for example, a non-contact surface roughness tester which uses an absolute level of a focus error signal to detect a displacement between the objective lens and the surface to be measured, and a focusing-type non-contact displacement detecting system which includes a drive arranged to the objective lens so as to make the latter follow the surface through feedback control of a focus error signal, detecting a displacement between the two through the drive.

Figure 9:
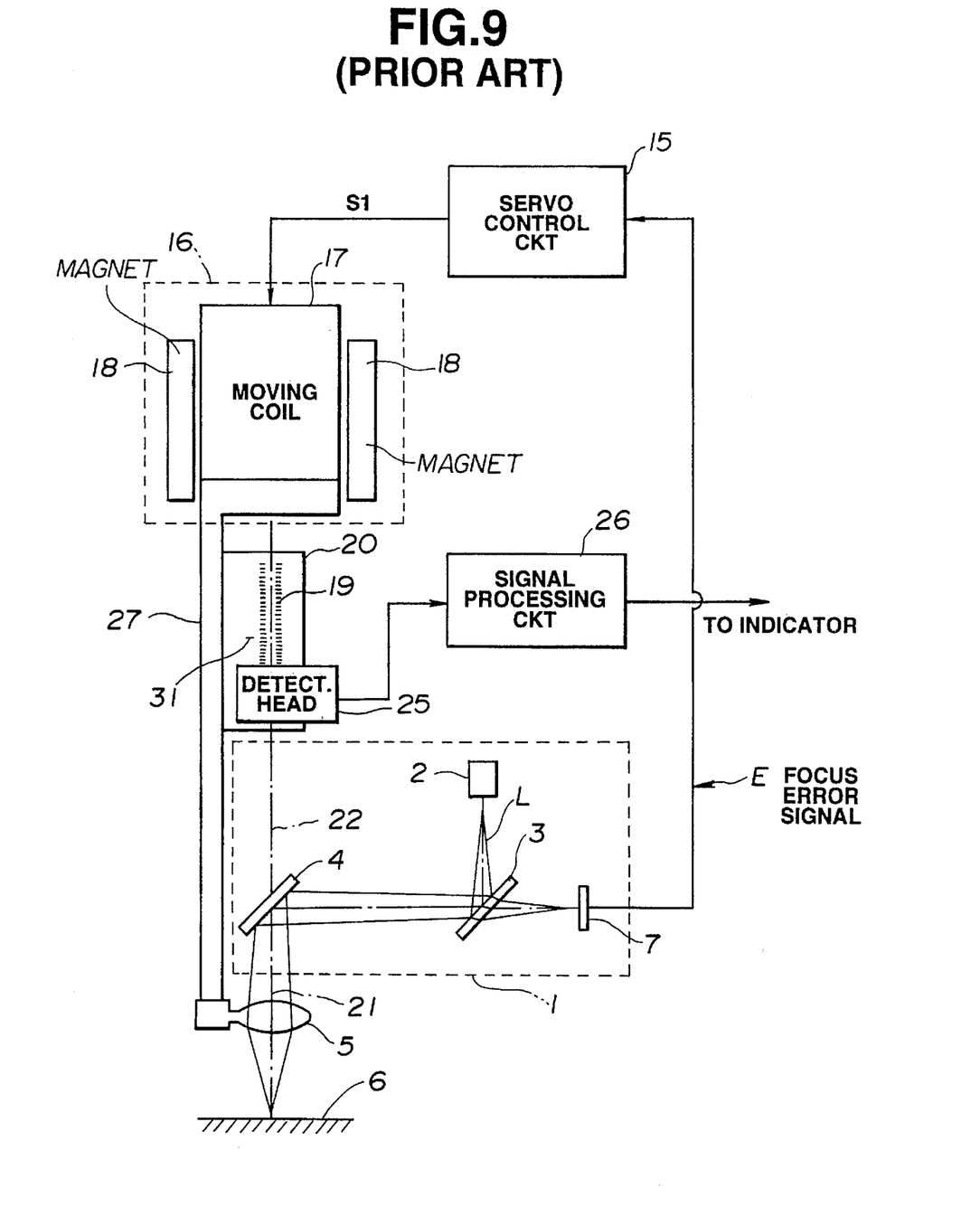
FIG. 9 is a view similar to FIG. 8, showing a conventional displacement detecting system.

FIG. 9 shows a constitution of the displacement detecting system disclosed in JP-A 4-366711. This system is a focusing-type non-contact detecting system with a scale. Referring to FIG. 9, an optical detector, designated generally by reference numeral 1, is arranged to detect through light reflected by a surface 6 to be measured a deviation of a distance between an objective lens 5 and the surface 6 from a focal length. An actuator 16 is arranged to move the objective lens 5 in the direction of an optical axis 21 in response to an output of a light receiving element 7 of the optical detector 1 so that the distance between the objective lens 5 and the surface 6 is equal to the focal length. A linear scale 20 is disposed on an axis 22 which is in line with the optical axis 21 of the objective lens 5, and integrally mounted to the actuator 16 so as to move together with the objective lens 5. The optical detector 1 comprises a laser diode 2, a beam splitter 3, and a mirror 4 in addition to the light receiving element 7.

The conventional displacement detecting system operates as follows: The optical detector 1 detects a deviation of the distance between the objective lens 5 and the surface 6 from the focal length through light reflected by the surface 6, and the actuator 16 moves the objective lens 5 in the direction of the optical axis 21 so that the distance between the objective lens 5 and the surface 6 is equal to the focal length in response to an output of the light receiving element 7 of the optical detector 1. The linear scale 20, disposed on the axis 22 which is in line with the optical axis 21 of the objective lens 5 and integrally mounted to the actuator 16, is moved together with the objective lens 5 in accordance with a displacement of the surface 6. By this, a displacement of the surface 6 can be detected as a displacement of the linear scale 20.

With the conventional displacement detecting system, however, the optical detector 1 needs at least the laser diode 2, beam splitter 3, mirror 4, and light receiving element 7, and is constructed by the combination of the above parts, resulting in a complicated constitution and increased size of the system. Further, due to the need of fine adjustment, the system has a weak point for a dislocation and vibration, resulting in unsuitable mass production.

Further, when the drive is arranged to the objective lens 5 so as to be variable with respect to the surface 6, a collimator lens is needed in addition to the objective lens 5, which may produce a dislocation upon mounting, resulting in a potential occurrence of an error factor.

Furthermore, due to lengthened optical path of the optical detector 1 upon position detection, the component parts of the optical detector 1 undergoes an influence of thermal expansion, etc. by temperature variation, resulting in a difficult measurement of the displacement amount of the surface 6 with accuracy higher than on the order of $\frac{1}{100}$ [μm].

It is, therefore, an object of the present invention to provide a system for detecting a displacement between an objective lens and a surface to be measured with high accuracy and a reduced size.

SUMMARY OF THE INVENTION

According to one aspect of the present invention, there is provided a system for detecting a displacement of a surface, comprising:
an objective lens movably disposed apart from the surface, said objective lens having a predetermined focal length and an optical axis;
one-chip optical integrated circuit means for producing laser light and generating in response to laser light reflected by the surface a focus error signal indicative of a deviation of a distance between the surface and said objective lens from said predetermined focal length;
control circuit means, connected to said one-chip optical integrated circuit means, for generating a drive signal so that said focus error signal is null;
means for moving in response to said drive signal said objective lens in a direction of said optical axis thereof; and
means for detecting a displacement amount of said objective lens.

According to another aspect of the present invention, there is provided a system for detecting a displacement of a surface, comprising:
a source of laser light;
an objective lens movably disposed apart from the surface, said objective lens condensing laser light of said source to the surface, said objective lens having a predetermined focal length and an optical axis;
means for generating in response to laser light reflected by the surface a focus error signal indicative of a deviation of a distance between the surface and said objective lens from said predetermined focal length;
control circuit means, connected to said focus error signal generating means, for generating a drive signal so that said focus error signal is null;
means for moving in response to said drive signal said objective lens in a direction of said optical axis thereof; and
means for detecting a displacement amount of said objective lens,
wherein said source of laser light and said focus error signal generating means are in a form of a one-chip optical integrated circuit.

DETAILED DESCRIPTION OF THE INVENTION

Referring to the drawings wherein like reference numerals designate like parts throughout the views, preferred embodiments of a displacement detecting system according to the present invention will be described.

Figure 1:
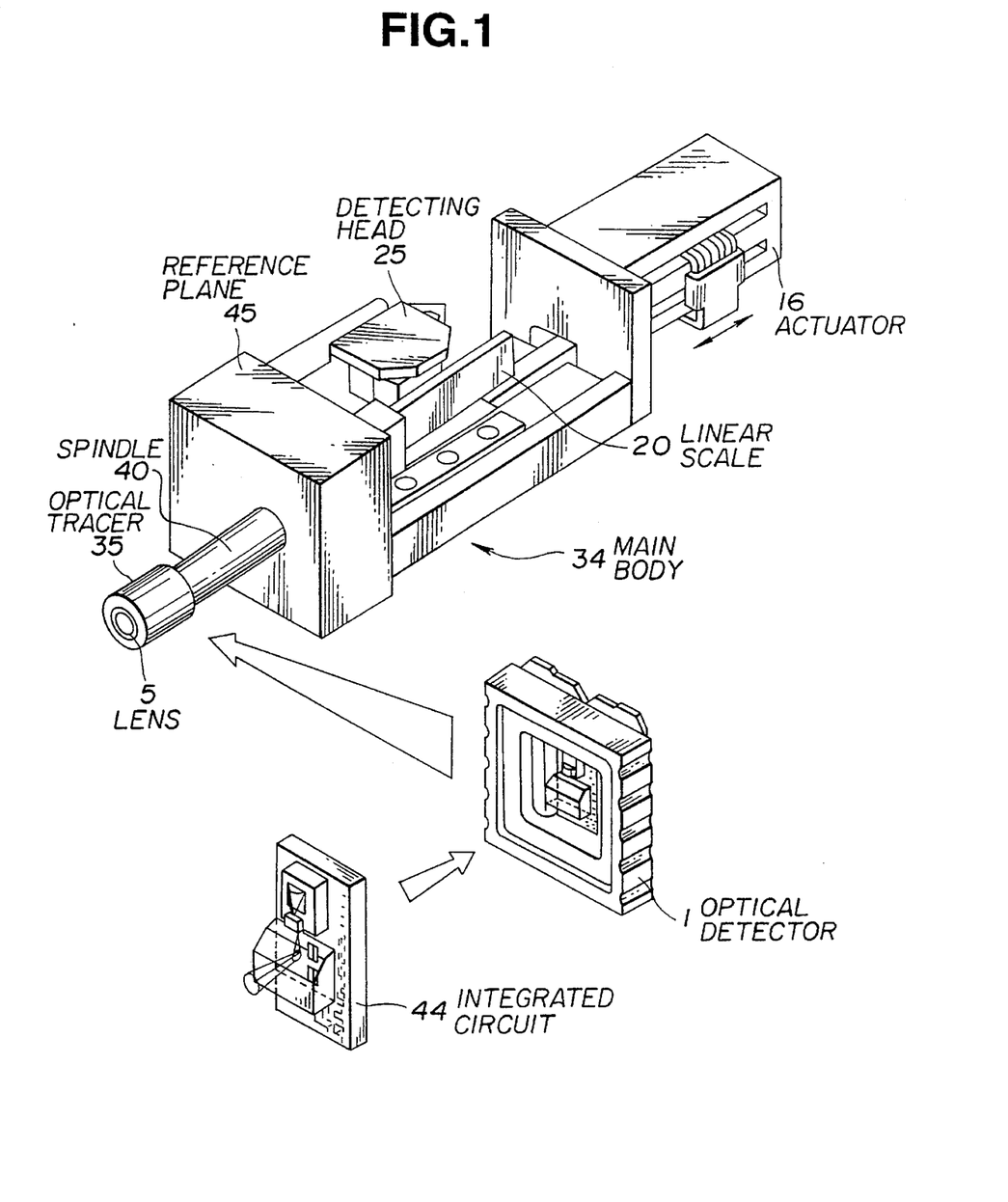
FIG. 1 is a schematic perspective view showing one preferred embodiment of a displacement detecting system according to the present invention.
Figure 2:
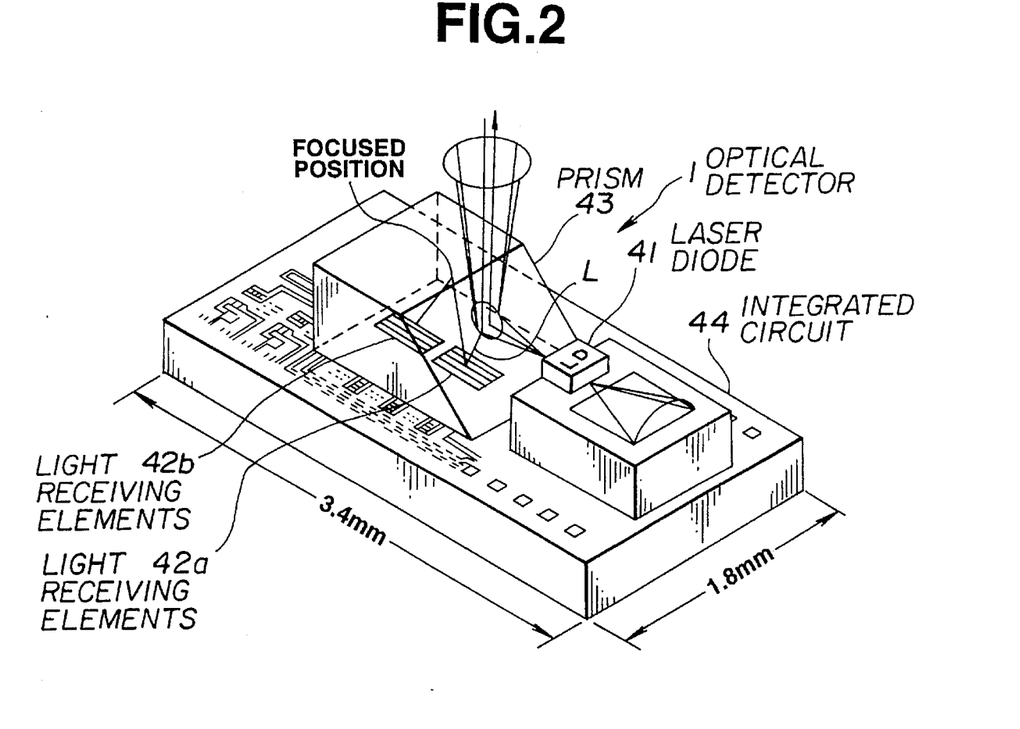
FIG. 2 is view similar to FIG. 1, showing a one-chip optical integrated circuit (IC) of an optical detector of the displacement detecting system.
Figure 3:
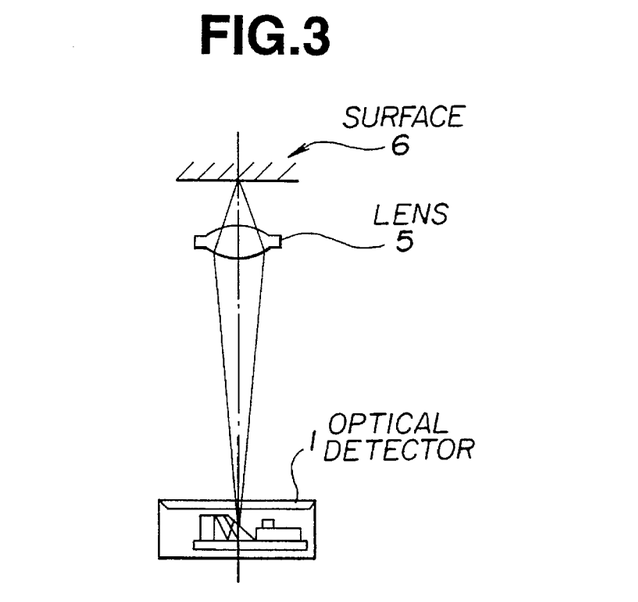
FIG. 3 is a diagrammatic view showing a relationship between the one-chip optical IC, an objective lens, and a surface to be measured.
Figure 4:
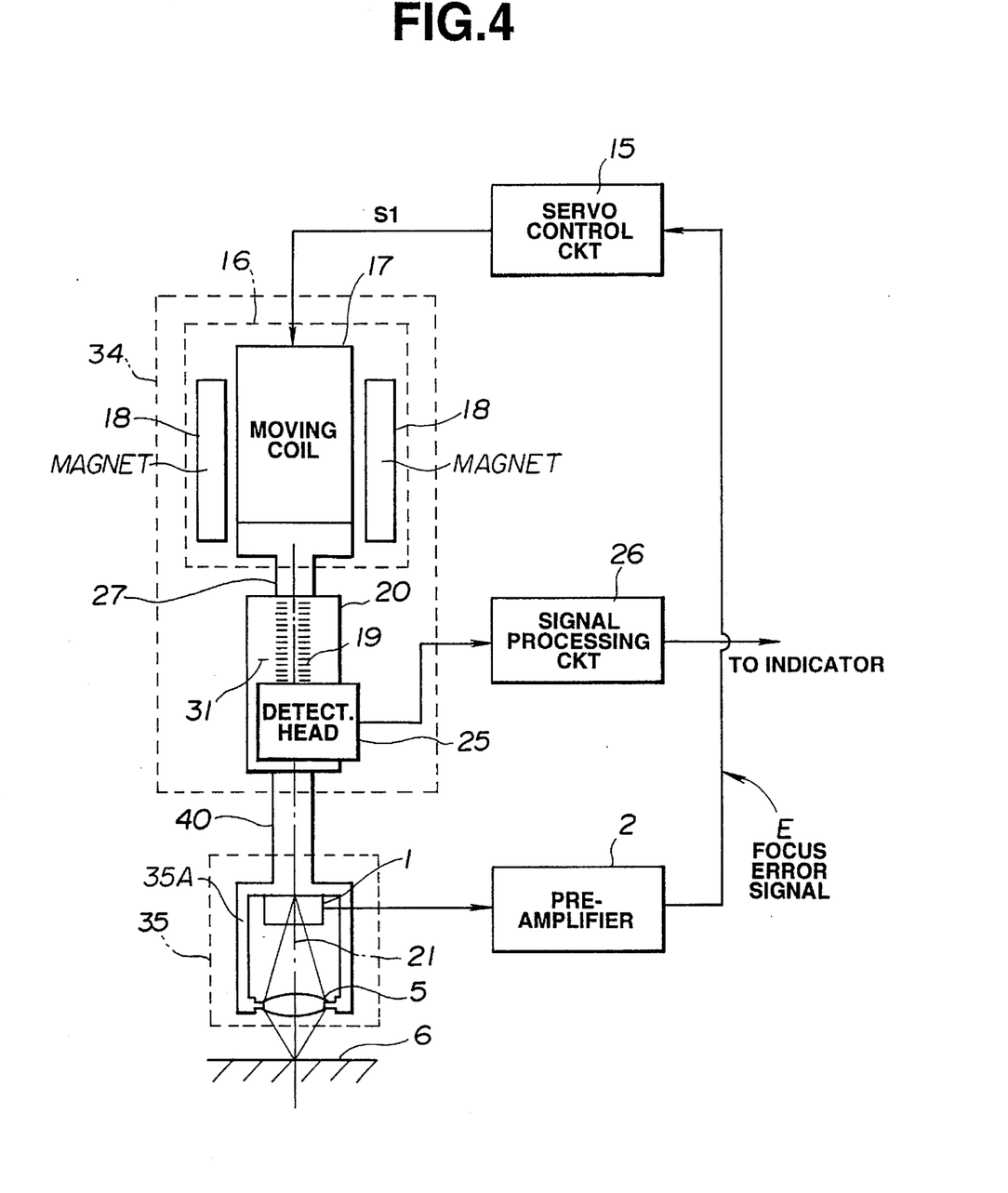
FIG. 4 is a block diagram showing a constitution of the one preferred embodiment of the present invention.

Referring first to FIG. 4, an optical detector, designated generally by reference numeral 1, is arranged to output a focus error signal E. Referring also to FIGS. 1–3, the optical detector 1 comprises a one-chip optical integrated circuit (IC) 44, a laser diode 41 as a light source, a prism 43 for reflecting laser light L emitted by the laser diode 41 to an objective lens 5, and a plurality of light receiving elements 42a, 42b for receiving laser light L reflected by a surface 6 to be measured. The optical detector 1 has a small outside dimension of, e.g., 6.5 [mm]×7.5 [mm]×1.4 [mm], and includes component parts arranged with accuracy. The optical detector 1 can be mass-produced, and at least half reduced in size by a further development of the integration technique.

As shown in FIGS. 1 and 4, the one-chip optical IC 44 of the optical detector 1, the objective lens 5, and a member 35A for supporting the two at a predetermined distance constitute an optical tracer 35.

The optical tracer 35 is arranged through a spindle 40 to a main body 34 which comprises an actuator 16 having a moving coil 17 and a permanent magnet 18, a linear scale 20, a detecting head 25, a connecting member 27, and mounting reference plane 45.

It is to be noted that a lead wire of the one-chip optical IC 44 of the optical detector 1 may be connected to a preamplifier 2 directly, or with a support of a support member (not shown), etc. For more compact constitution, the lead wire of the one-chip optical IC 44 may be disposed in a cavity formed in the spindle 40 in the longitudinal direction thereof.

As best seen in FIGS. 2 and 3, laser light L emitted by the laser diode 41 of the one-chip optical IC 44 is reflected by the prism 43 toward the objective lens 5 with a focal length $f_1$. Laser light L incident on the objective lens 5 is condensed to the surface 6 by the objective lens 5.

Laser light L reflected by the surface 6 is incident on the objective lens 5, then on the prism 43. Laser light L incident on the prism 43 is detected by the plurality of light receiving elements 42a, 42b disposed before and behind a focused position.

Figure 5A:
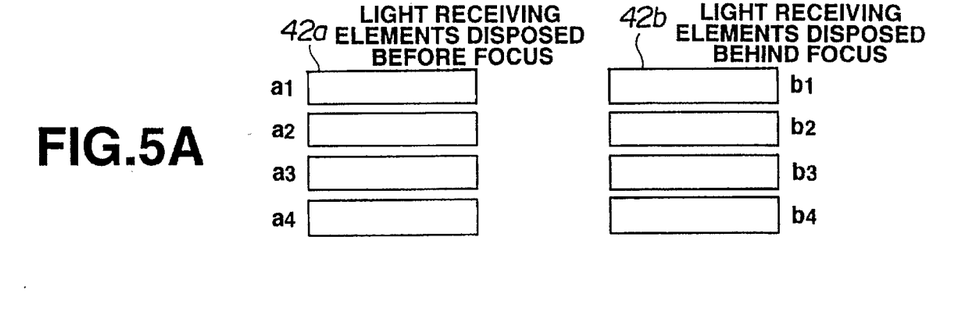
FIGS. 5A–5D are views similar to FIG. 3, each for explaining the operation of light receiving elements.
Figure 5B:
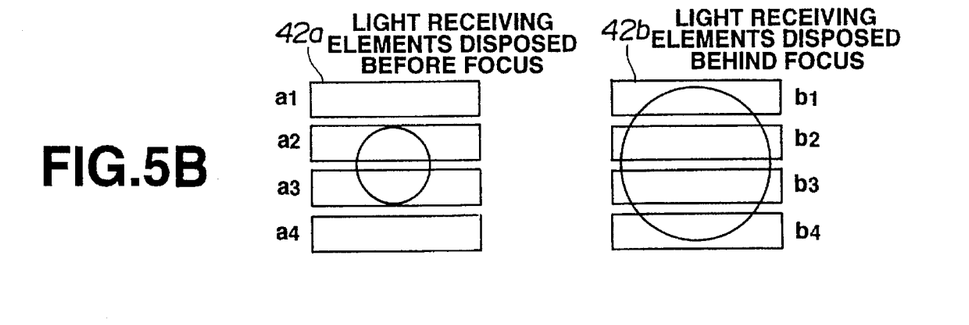
Figures 5C, 5D:
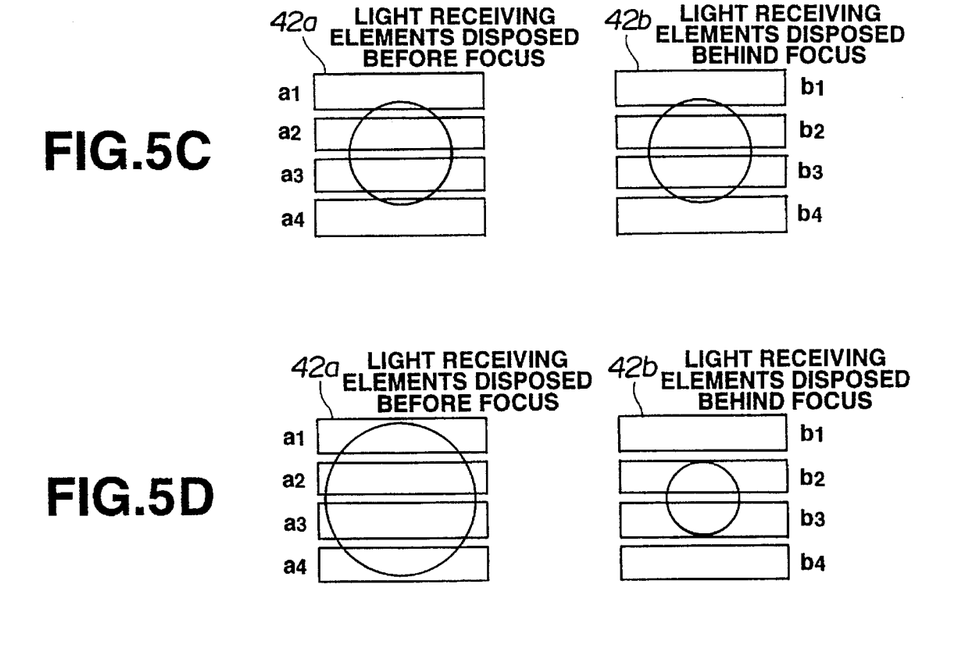

By way of example, referring to FIG. 5A, each of the light receiving elements 42a, 42b is in the form of a photodetector array having four strip-shaped photodetectors $a_1$–$a_4$, $b_1$–$b_4$ disposed in parallel rows. These two sets of photodetector arrays $a_1$–$a_4$, $b_1$–$b_4$ are disposed to be symmetrical with respect to the focused position. Referring to FIGS. 5B–5D, a detection of the focused position is carried out by making a comparison between the magnitudes of the diameters of spots of light falling on the two sets of photodetector arrays $a_1$–$a_4$. When the objective lens 5 is farther than the focal length $f_1$ with respect to the surface 6, the diameter of the spot of light falling on the photodetector array $a_1$–$a_4$ disposed before the focused position is smaller than that of the spot of light falling on the photodetector array $b_1$–$b_4$ disposed behind the focused position as shown in FIG. 5B. When the distance between the objective lens 5 and the surface 6 is equal to the focal length $f_1$, the two spots of light falling on the photodetector arrays $a_1$–$a_4$, $b_1$–$b_4$ have the same diameter as shown in FIG. 5C. When the objective lens 5 is nearer than the focal length $f_1$ with respect to the surface 6, the diameter of the spot of light falling on the photodetector array $a_1$–$a_4$ before the focused position is larger than that of the spot of light falling on the photodetector array $b_1$–$b_4$ behind the focused position as shown in FIG. 5D.

In such a way, the diameters of the spots of light falling on the light receiving elements 42a, 42b are varied with the distance between the objective lens 5 and the surface 6. It is thus understood that the focused position can be detected on an output change of each of the photodetectors $a_1$–$a_4$, $b_1$–$b_4$. The focus error signal E is generated which is expressed by the following equation:

$$\text{Focus error signal } E=(a_1+a_4+b_2+b_3)-(a_2+a_3+b_1+b_4)$$

Figure 6:
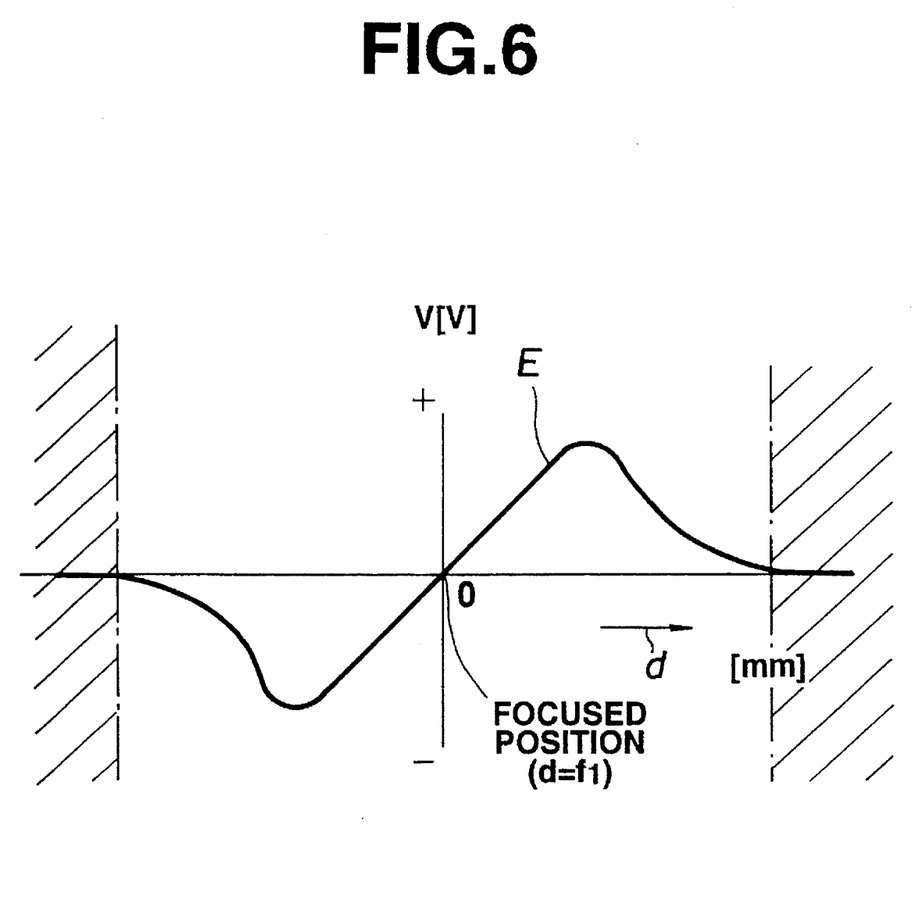
FIG. 6 is a graph showing a characteristic of a focus error signal.

It is to be noted that each light receiving element may be a four-division diode disclosed in the aforementioned JP-A 4-366711. Referring to FIG. 6, a graph has an x-axis indicative of the distance "d" [mm] between the objective lens 5 and the surface 6, and a y-axis indicative of a voltage level V [v] of the focus error signal E. The origin O is indicative of the focused position where the focal length $f_1$ is equal to the distance "d" between the objective lens 5 and the surface 6.

Referring again to FIG. 4, the focus error signal E with a characteristic as illustrated in FIG. 6 is provided to a servo control circuit 15 which comprises a comparator circuit and a servo amplifier, and provides a drive signal S1 to the moving coil 17 of the actuator 16 so that the focus error signal E is 0.

The actuator 16 comprises the moving coil 17, the permanent coil 18, and a rod-shaped connecting member 27. The moving coil 17 has one end secured to one end of the connecting member 27, and the optical tracer 35 is secured to another end of the connecting member 27 through the spindle 40.

Moreover, the scale 20 with graduations 19 is secured to the connecting member 27 in a predetermined position thereof. The graduations 19 of the linear scale 20 are found on an extension line of the optical axis 21. In other words, the linear scale 20 is disposed on an axis which is in line with the optical axis 21.

It is to be noted that the linear scale 20 may be an optical scale with interference fringes recorded as the graduations 19. Moreover, a magnetic scale or a capacitive scale may be used.

The graduations 19 of the linear scale 20 can be detected by a detecting head 25 secured to a chassis or the like with the mounting reference plane 45. It is to be noted that the mounting reference plane 45 may be arranged on only on face of the chassis or the like, or on each of four faces thereof.

Thus, with a displacement of the linear scale 20, the detecting head 25 provides an output signal to a signal processing circuit 26, enabling a detection of the displacement amount of the linear scale 20. The displacement amount of the linear scale 20 as detected is provided to an indicator or a data logger (not shown) from the signal processing circuit 26.

In this embodiment, the linear scale 20 is connected to the connecting member 27 so as to be movable, whereas the detecting head 25 is secured to the chassis or the like. Alternatively, the linear scale 20 may be secured to the chassis or the like, whereas the detecting head 25 may be connected to the connecting member 27 so as to be movable.

In that case, as described above, the servo control circuit 15 provides the drive signal S1 to the moving coil 17 of the actuator 16 so that the focus error signal E is 0.

Thus, the distance "d" between the objective lens 5 of the optical tracer 35 integrally mounted to the moving coil 17 through the connecting member 27 and spindle 40 and the surface 6 is controlled in a feedback way to always have a value equal to the focal length $f_2$ of the objective lens 5. This means that the displacement detecting system of the present invention can follow a fine displacement of the surface 6.

Therefore, when having a displacement of the surface 6, the optical tracer 35 is moved to maintain the focal length $f_1$. This movement of the optical tracer 35 is indicated on the graduations 19 of the linear scale 20, which is read by the detecting head 25, enabling a detection of a displacement of the surface 6. In response to an output signal of the detecting head 25, the displacement amount of the surface 6 can be calculated in the signal processing circuit 26.

The displacement amount of the surface 6 as calculated can be indicated on the indicator (not shown) or recorded in the data logger (not shown), allowing an easy automatic measurement. An execution of interpolation processing in the signal processing circuit 26 enables a measurement of the displacement amount of the surface 6 with high resolving power.

Since the linear scale 20 or the detecting head 25 which is movable together with the optical tracer 35 in the direction of the optical axis 21, etc. is disposed on the axis which is in line with the optical axis 21 of the objective lens 5, the displacement amount of the surface 6 as obtained in such a way has no Abbe error produced due to an inclination of the linear scale 20 or the detecting head 25 in the direction of the optical axis 21, etc. As a result, the displacement amount of the linear scale 20 or the detecting head 25 is in one-to-one correspondence with the displacement amount of the objective lens 5, resulting in a detection of the displacement amount of the surface 6 with very high accuracy.

Further, a wide detection range corresponding to a detection range of the linear scale 20 or a full scale of the graduations 19 is ensured without any deterioration of detection accuracy.

Furthermore, due to feedback control, even if the sensitivity of the focus error signal E is varied with the reflectance of the surface 6, there is no occurrence of a measurement error, nor occurrence of an error resulting from a dispersion or drift of elements of the servo control circuit 15 and the actuator 16, resulting in a saving of time for adjustment and calibration of the displacement detecting system, and a long and stable detection of a displacement of the surface 6.

Referring to FIG. 1, the actuator 16 is in the form of a voice coil motor, having an excellent linearity with respect to a displacement of the surface 6. This is due to the fact that the voice coil motor is a motor which presents a linear displacement with respect to current provided to the moving coil 17. It will be thus understood that a measurement of current provided to the moving coil 17 allows an easy detection of the displacement amount of the surface 6. It is to be noted that the actuator 16 is not limited to the voice coil motor, and may be a DC servo motor, a stepping motor, or a voltage element.

Moreover, the method of obtaining the focus error signal E may be the optical astigmatic method, critical angle detecting method, or knife edge method. Any of these methods carries out a control so that the focus error signal E is 0, enabling a detection of a displacement of the surface 6 with accuracy even if the reflectance thereof is different.

If a scale origin 31 is formed on the linear scale 20, the displacement amount of the surface 6 can be detected with respect to a position of the scale origin 31 as a reference position.

Figure 7:
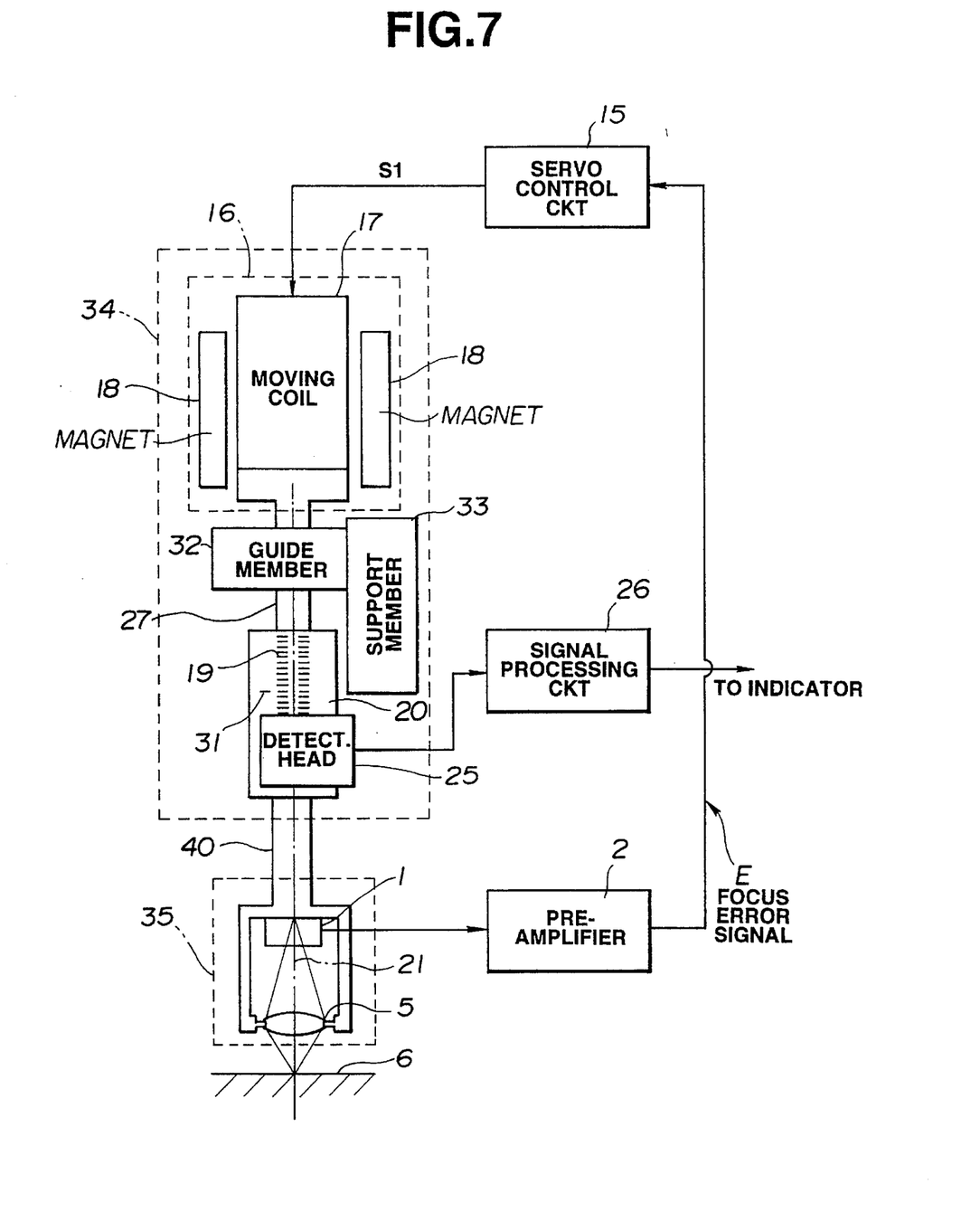
FIG. 7 is a view similar to FIG. 4, showing another preferred embodiment of the present invention.

Referring to FIG. 7, another preferred embodiment of the present invention will be described. The another preferred embodiment is substantially the same as the above one preferred embodiment except a guide member 32 through which the connecting member 27 is arranged. It is desirable that the guide member 32 is disposed on the extension line of the optical axis 21 of the objective lens 5 and at the back of the linear scale 20 so as to obtain improved running accuracy. The guide member 32 and the detecting head 25 are mounted to a support member 33 which is secured to the chassis (not shown).

In such as way, according to this embodiment, the disposition of the guide member 32 contributes to an improvement of a running accuracy of the connecting member 27, resulting in improved read accuracy of the detecting head 25 with respect to the linear scale 20. A guide mechanism of the guide member 32 may be of the contact type such as a bearing or the like, or of the non-contact type using a magnet or an air slide which enables a construction of the displacement detecting system with higher accuracy.

Figure 8:
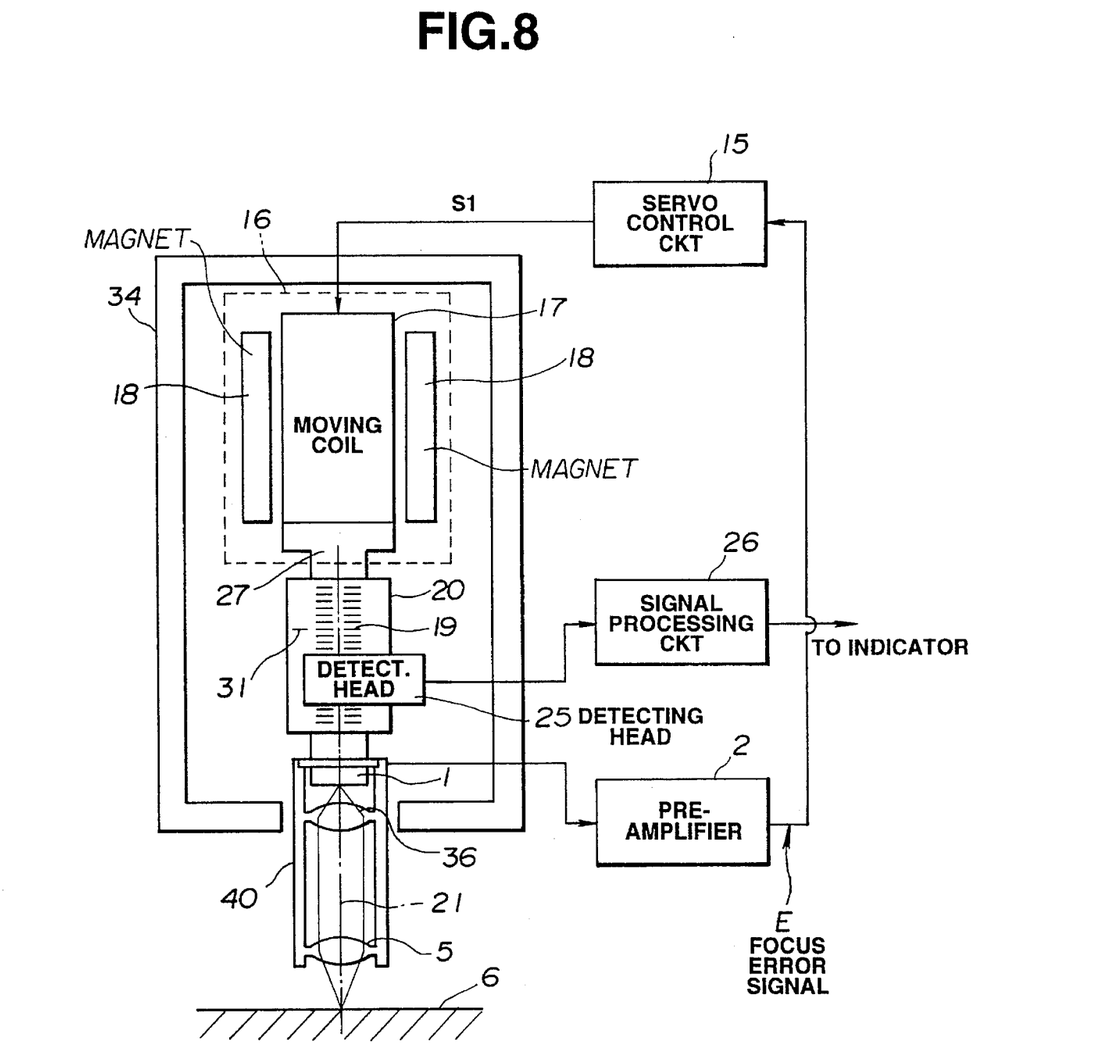
FIG. 8 is a view similar to FIG. 7, showing another preferred embodiment of the present invention.

Referring to FIG. 8, another preferred embodiment of the present invention will be described. This preferred embodiment is substantially the same as the one preferred embodiment in a constitution of the spindle 40. That is, the spindle 40 is connected to the linear scale 20 at a lower end thereof. The spindle 40 has a cavity in the longitudinal direction thereof. The one-chip optical IC 44 of the optical detector 1 is arranged in the cavity of the spindle 40 at one end thereof on the side of the linear scale 20. Moreover, a collimator lens 36 is arranged in the cavity of the spindle 40 at the one end thereof on the side of the linear scale 20 and below the one-chip optical IC 44. The objective lens 5 is arranged in the cavity 40 at another end thereof. The spindle 40, which includes the optical detector 35, is constructed so that a portion having the one-chip optical IC 44 of the optical detector 1 and the collimator lens 36 is covered by the main body 34.

According to this embodiment, since the one-chip optical IC 44 of the optical detector 1 is arranged in the cavity of the spindle 44 and inside of the main body 34, the spindle 40 can be thin and have a pointed end resulting in a space-saving.

Having described the present invention in connection with the preferred embodiments, it is to be noted that the present invention is not limited thereto, and various changes and modifications can be made without departing from the spirit of the present invention.

What is claimed is:

1. A system for detecting a displacement of a surface, comprising:
   an objective lens movably disposed apart from the surface, said objective lens having a predetermined focal length and an optical axis;
   a one-chip optical integrated circuit for producing laser light and generating in response to laser light reflected by the surface a focus error signal indicative of a deviation of a distance between the surface and said objective lens from said predetermined focal length;
   control circuit means, connected to said one-chip optical integrated circuit, for generating a drive signal so that said focus error signal is null;
   objective lens moving means for moving said objective lens in a direction of said optical axis thereof in response to said drive signal;
   connecting means for connecting said one-chip optical integrated circuit and said objective lens moving means; and
   displacement detecting means for detecting a displacement amount of said objective lens;
   said one-chip optical integrated circuit, said connecting means and said displacement detecting means being disposed on an axis which is in line with said optical axis of said objective lens.

2. A system as claimed in claim 1, wherein said connecting means includes a spindle and a connecting member.

3. A system as claimed in claim 2, wherein said spindle is formed with a cavity in a longitudinal direction thereof, in which a lead wire of said one-chip optical integrated circuit is disposed.

4. A system as claimed in claim 3, wherein said cavity of said spindle has one end portion facing a main body wherein said one-chip optical integrated circuit and a collimator lens are disposed, and another end portion facing the surface wherein said objective lens is disposed, said one end portion being covered by said main body.

5. A system as claimed in claim 1, wherein said one-chip optical integrated circuit includes a laser diode, a plurality of light receiving elements, and a prism.

6. A system as claimed in claim 1, wherein said control circuit includes a comparator circuit and a servo amplifier.

7. A system as claimed in claim 1, wherein said objective lens moving means includes an actuator having a moving coil and a permanent coil.

8. A system as claimed in claim 1, wherein said displacement detecting means includes a linear scale and a detecting head.

9. A system as claimed in claim 5, wherein said plurality of light receiving elements are in a form of a photodetector array having a plurality of strip-shaped photodetectors disposed in parallel rows.

10. A system as claimed in claim 7, wherein said actuator is a voice coil motor, a DC servo motor, a stepping motor, or a voltage element.

11. A system as claimed in claim 8, wherein said linear scale is an optical type, a magnetic type, or a capacitive type.

12. A system as claimed in claim 1, wherein said error signal is obtained by an optical astigmatic method, a critical angle detecting method, or a knife edge method.

13. A system as claimed in claim 2, further comprising a guide member through which said connecting member is arranged, and a support member for supporting said guide member.

14. A system for detecting a displacement of a surface, comprising:
   a source of laser light;
   an objective lens movably disposed apart from the surface, said objective lens condensing laser light of said source to the surface, said objective lens having a predetermined focal length and an optical axis;
   focus error signal generating means for generating in response to laser light reflected by the surface a focus error signal indicative of a deviation of a distance between the surface and said objective lens from said predetermined focal length;
   control circuit means, connected to said focus error signal generating means, for generating a drive signal so that said focus error signal is null;
   objective lens moving means for moving said objective lens in a direction of said optical axis thereof in response to said drive signal;
   connecting means for connecting said source and said objective lens moving means; and
   displacement detecting means for detecting a displacement amount of said objective lens;
   wherein said source of laser light and said focus error signal generating means are in a form of a one-chip optical integrated circuit;
   said one-chip optical integrated circuit, said connecting means and said displacement detecting means being disposed on an axis which is in line with said optical axis of said objective lens.

* * * * *